Oct. 27, 1925.
F. D. SUYDAM, JR
1,559,529
VEHICLE BODY
Filed March 25, 1922 3 Sheets—Sheet 3
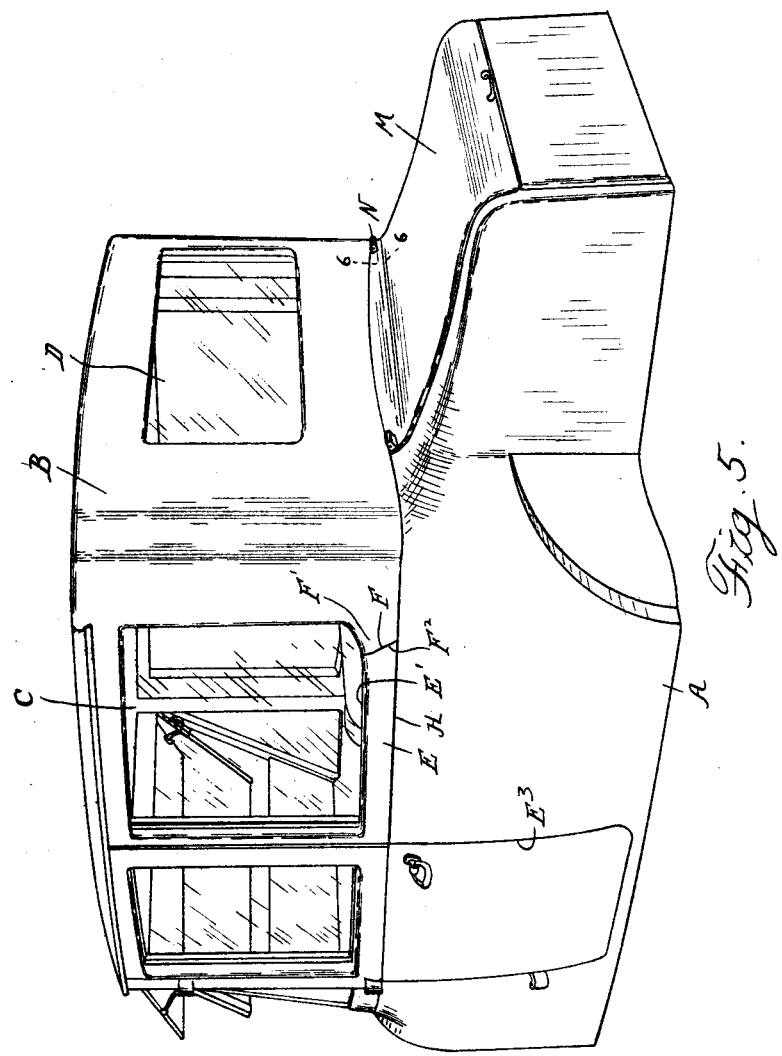
Inventor
Frank D. Suydam Jr.

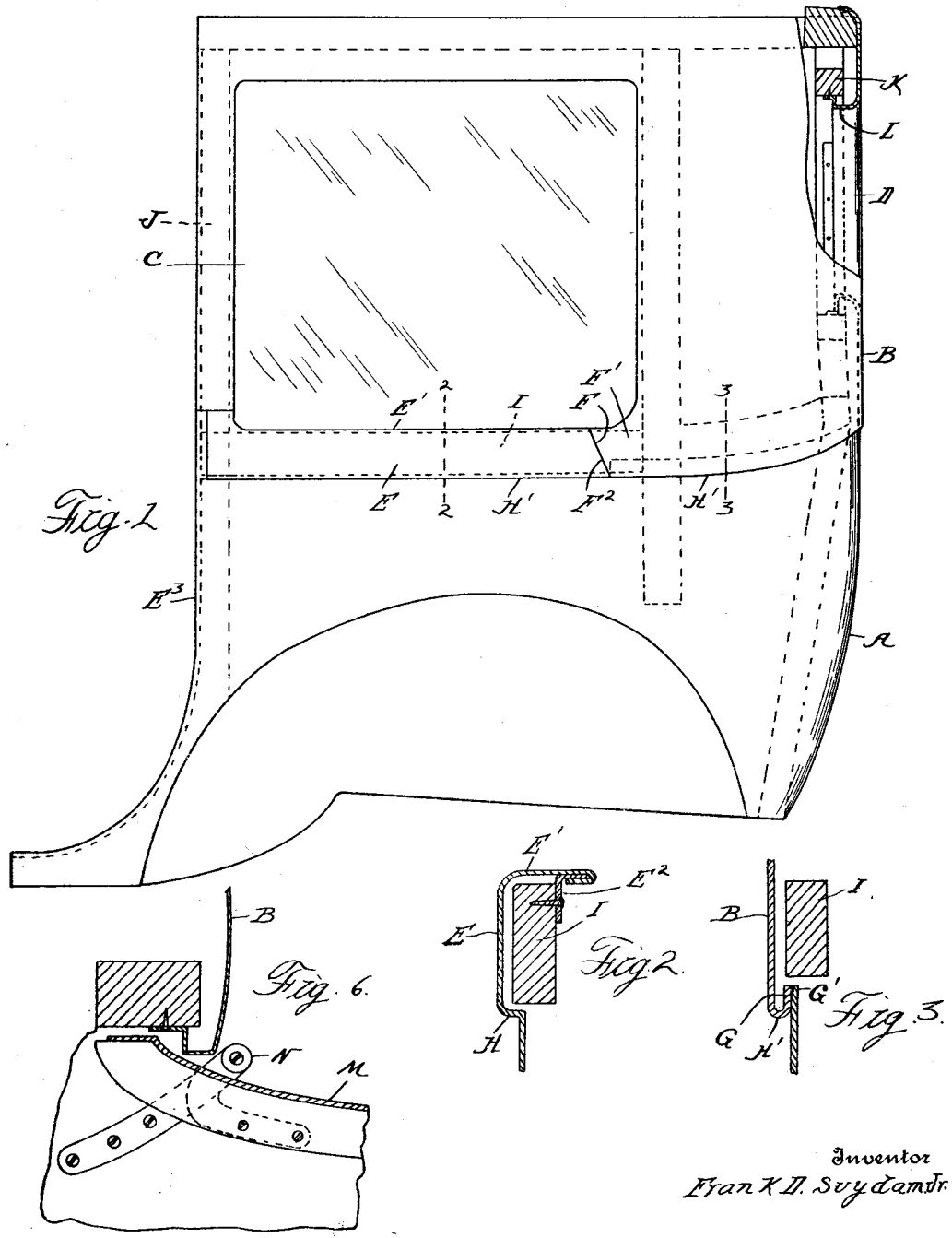

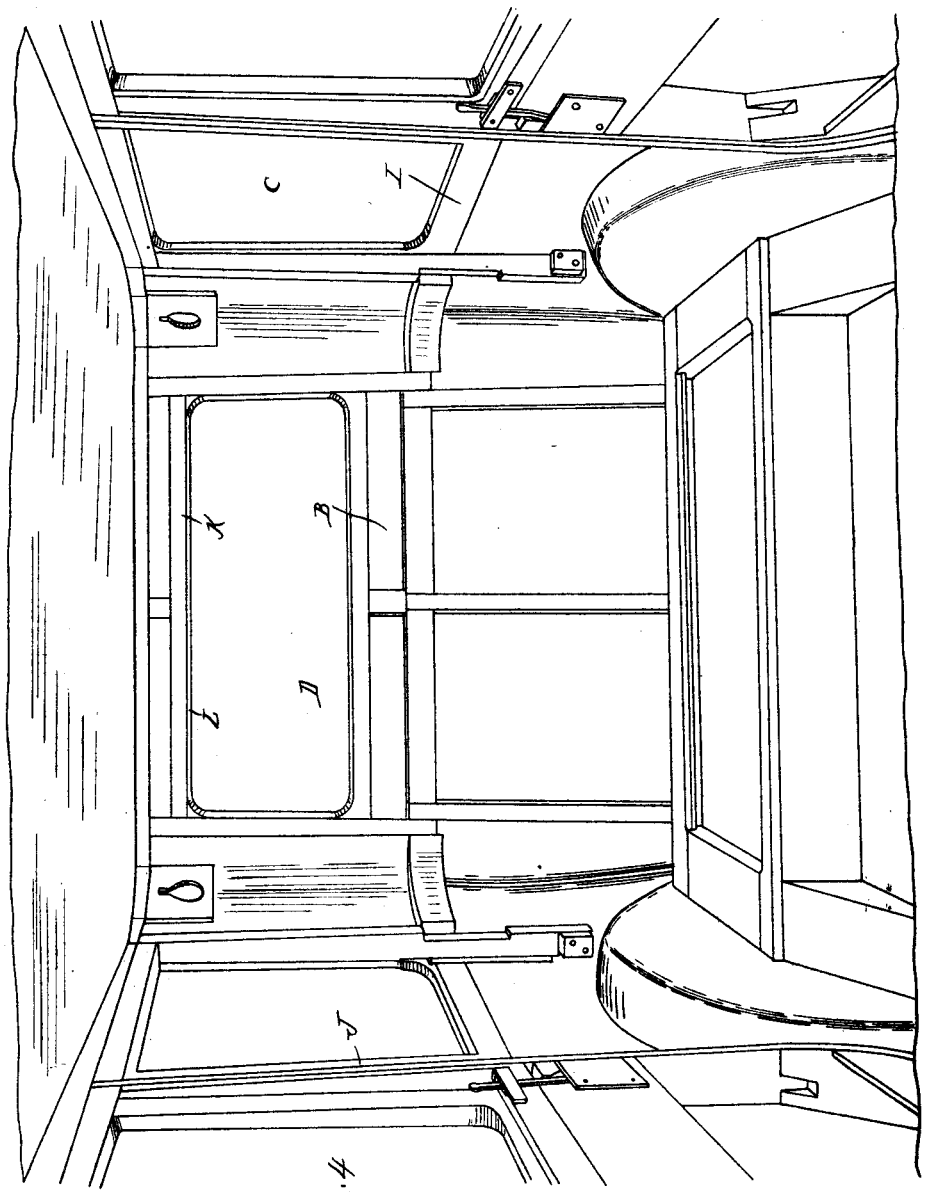

Patented Oct. 27, 1925.

1,559,529

UNITED STATES PATENT OFFICE.

FRANK D. SUYDAM, JR., OF TOLEDO, OHIO.

VEHICLE BODY.

Application filed March 25, 1922. Serial No. 546,626.

*To all whom it may concern:*

Be it known that I, FRANK D. SUYDAM, Jr., a citizen of the United States of America, residing at Toledo, in the county of Lucas and State of Ohio, have invented certain new and useful Improvements in Vehicle Bodies, of which the following is a specification, reference being had therein to the accompanying drawings.

This invention relates to vehicle bodies and more particularly relates to the closed bodies of automobiles.

The invention consists in a number of structural features and especially in the provision of a joint between the top portion and tonneau portion of a closed vehicle body, that will be independent of any attachment to the frame, that will be completely weather proof and that will directly join the two said parts of the body without requiring any separate finishing strip.

A feature of the construction also is the use of a return bend adjacent the joint between the upper and lower sections of the metal shell of the body, to conceal said joint, protect the same from the weather, and provide to some extent for absorption of shocks and vibration to thereby decrease the resulting strain on said joint.

In the drawings:—

Figure 1 is a view in side elevation of a portion of a closed vehicle body sufficient to illustrate the invention;

Figures 2 and 3 are respectively sectional details on lines 2—2 and 3—3 of Figure 1;

Figure 4 is a perspective interior view of the improved body;

Figure 5 is an exterior perspective view of a coupé body employing features of the invention; and Figure 6 is a section on line 6—6 of Figure 5.

In these views the reference character A designates the sheet metal shell of the tonneau portion of a closed vehicle body and B is a sheet metal section adapted to form the rear upper portion of said body. C and D respectively designate window openings formed in the sides and rear of the upper portion of said body. The member A at each side is formed with an integral upwardly projecting offset portion E which is inwardly flanged as indicated at E' to form a sill for the window opening C, said flange E' being terminally return-bent to engage an angle bar E² upon the belt rail I. The forward edges E³ of the member A forms the rear sides of door openings and the portion E extends from the edge E³ to the rear portion of the opening C terminating in an inclined edge F. The upper section B has forwardly projecting portions F' complementary to the portions E and having inclined front edges F² abutting against and welded to said edges F. The lower edge of the top section B is interiorly return-bent as indicated at G and exteriorly overlaps the top marginal portion of the section A, being welded or otherwise rigidly secured to the latter as indicated at G'. The return-bent lower margin G of the section B is so proportioned with respect to the outwardly offset portion E as to produce with the latter a smooth continuous surface. In other words the shoulder H formed at the juncture of the part E and section A registers exactly with the shoulder H' formed between the members A and B, said shoulder spacing the bead E and section B outwardly from the section A precisely the same distance. Thus it is seen that while the sections A and B are directly joined, there is secured the effect of a bead or rounded shoulder at the joint between said parts, said shoulder being formed upon the tonneau section beneath the side windows and being formed upon the upper section B at the rear of the body and on the rear portions of the sides thereof.

The described metallic body is reinforced, as is the usual practice by an interior framework of wood. This frame-work best seen in Figure 4, is distinctive in that the belt rail I, while it may follow the described joint between sections A and B, lacks any connection to said joint. In other words, this invention avoids the usual practice of nailing the metal sections to the belt rail, so that the smooth exterior face of the body is not marred by nail heads and there are no nail holes in which moisture may lodge to form starting points for corrosion. The wooden frame-work further comprises frame J and K marginal to the windows C and D, the frame K being secured to and carried by an inturned flange L which is formed marginally of the opening D.

The described construction avoids the use of an exterior beading strip separately applied to the joint between the upper and lower sections of a closed top, such a strip being objectionable because of a tendency to work loose through vibration and strain. Also said joint is one that may be established with a minimum labor and expense. The location of the abutting faces of the joint above the shoulder H' is a safeguard against moisture lodging between said faces. Thus the finish of the body below said joint will not be marred by rust stains, such as, in present constructions sometimes result from corrosion at the joint. It is to be noted that the joint is entirely concealed, except for the presence of the shoulder H', so as to detract nothing from the appearance of the body.

In the absence of any direct connection between the body shell and the belt rail and other bracing elements of the wooden frame, the latter may be formed of lumber which is more or less in the rough, there being no necessity for conforming said frame elements exactly to the contour of the shell.

It is a feature of the invention that the weld G' connects only an edge portion of the return bend G to the section A, (see Fig. 3) so that the U-shaped portion which comprises the shoulder H' is to some extent free to absorb shocks and vibration by flexing, thus decreasing the strains acting upon the joint between parts A and B.

Also, the avoidance of a connection between the wooden frame work and the metal shell, intermediately of the height of the body, allows a limited movement of the frame work under stress, without resulting strain upon the joint between the upper and lower sections of the shell.

The coupé construction, shown in Figures 5 and 6 employs substantially the features which have been described, but has the deck lift M which extends at its front end beneath the upper back portion of the shell and is hinged thereto, as indicated at N.

What I claim as my invention is:—

1. In a vehicle body, upper and lower sheet metal sections directly rigidly connected, one of said members being inwardly offset at the joint between the sections, and a continuation of said offset being formed upon the other section.

2. A vehicle body comprising upper and lower sections, the former having an exterior shoulder coextensive with one portion of the joint between said sections and the latter having an elongated registering shoulder.

3. In a vehicle body, upper and lower sheet metal sections rigidly connected, the upper section forming a shoulder following the joint between the two sections at the back and the rear portions of the sides of the body, and the lower section forming a continuation of said shoulder forwardly of the upper section.

4. A vehicle body, comprising upper and lower sheet metal sections rigidly connected, the lower section having an upstanding outwardly offset marginal portion forming a windowsill and the upper section being outwardly offset in registration with said upstanding portion of the lower section and further forming the rear edges of said window opening.

5. In a vehicle body, an interior frame, and a shell comprising upper and lower sheet metal side panel sections rigidly connected independently of the said frame.

6. A vehicle body comprising a tonneau section and a top section formed of sheet metal and rigidly connected, and a belt rail extended in proximity to the joint between said sections and disconnected from said sections.

7. A vehicle body comprising a tonneau section and a top section formed of sheet metal and rigidly connected, and jointly forming window and door openings, and a frame work comprising uprights marginal to said openings and a belt rail extended in proximity to the joint between said sections and disconnected from said sections.

8. In a vehicle body, upper and lower sheet metal sections directly rigidly connected, the upper section being outwardly offset from the lower, the lower margin of the upper section being inturned to engage an upper marginal portion of the lower section forming a shoulder, and the lower section having a portion extended above said shoulder, said portion being outwardly offset to form a shoulder registering with that of the upper section.

In testimony whereof I affix my signature.

FRANK D. SUYDAM, Jr.